UNITED STATES PATENT OFFICE.

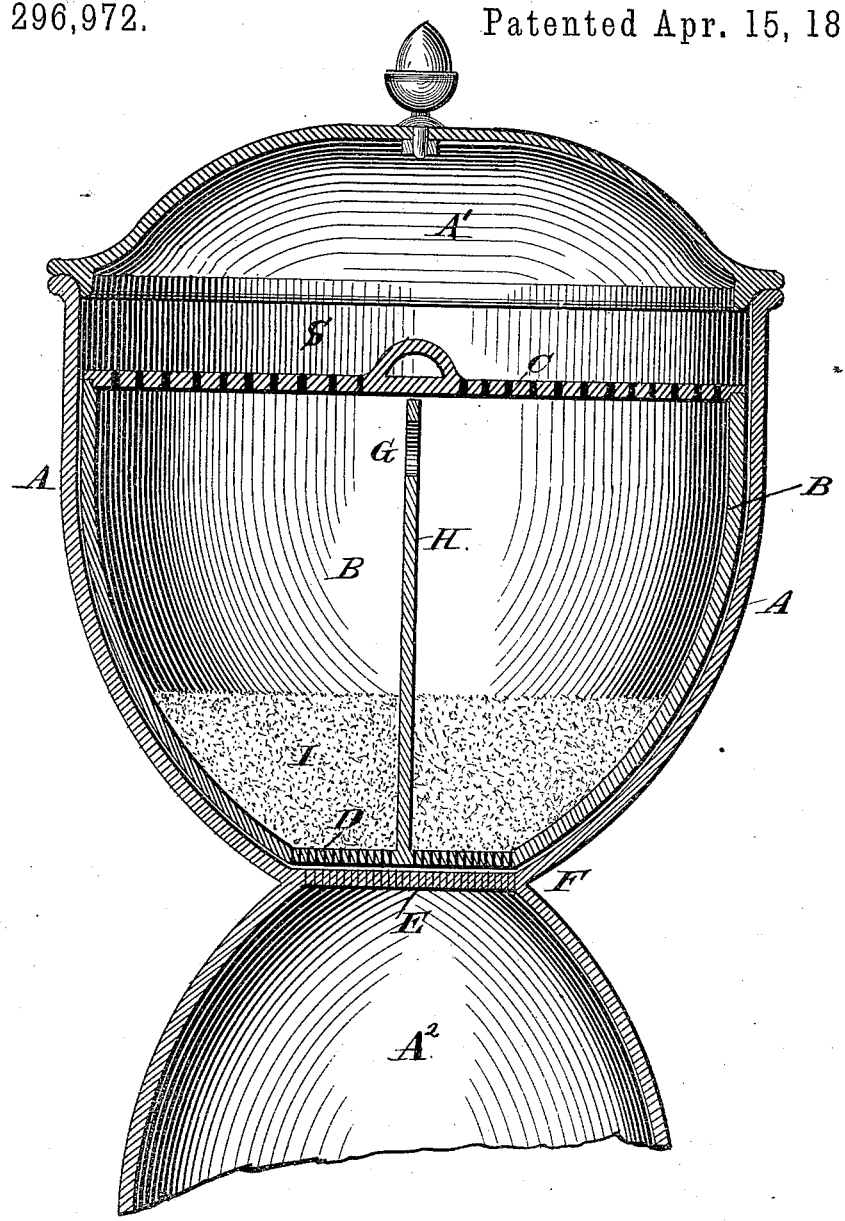

EMILE KARST, OF ST. LOUIS, MISSOURI.

WATER-FILTER.

SPECIFICATION forming part of Letters Patent No. 296,972, dated April 15, 1884.

Application filed November 2, 1883. (No model.)

*To all whom it may concern:*

Be it known that I, EMILE KARST, a citizen of the United States, and a resident of St. Louis, in the county of St. Louis and State of Missouri, have invented certain new and useful Improvements in Water-Filters; and I do hereby declare that the following is a full, clear, and exact description thereof, which will enable others skilled in the art to which it appertains to make and use the same, reference being had to the accompanying drawing, which forms a part of this specification.

My invention has relation to water-filters of that class which are in the nature of percolators, the water being filtered and purified by percolating through foraminated disks and through a charge of fine sand or similar material placed upon the disks.

The nature of my improvement will be readily understood by reference to the annexed drawing, in which I have shown a vertical sectional view through the middle of the filters.

In the said drawing, A represents the outer jar, which may be of earthenware, glass, porcelain, metal, or any other desired material. Fitting inside of this jar is an inside receptacle, B, made, by preference, of unglazed earthenware, and having a perforated cover, C. This inner receptacle, B, should be of less depth than the outer vessel, A, so as to leave a space, S, in which the water is poured; and, if desired, the outside receptacle, A, may be provided with a closely-fitting ornamental cover, A', to protect the perforated cover C from dust and other impurities. The inner receptacle, B, is provided with a vertical partition or wall, H, which extends up to the cover C, and is provided with an opening, G, at its upper end, through which the fingers of the hand may be inserted when cover C is removed, if it is desired to remove the inner jar from the outside vessel within which it is placed. The bottom of jar B is formed by a foraminated plate, D, which when the two vessels A and B are in their proper position relative to each other, will be a short distance above a foraminated plate, E, placed in the neck or narrow part F of the outside jar, A. Below this neck, jar A is again enlarged, as shown at $A^2$, to form a receptacle, which may be of any desired size and shape, for the filtered water, and from which the same may be drawn off through a suitably-arranged faucet. (Not shown in the drawing.)

By reference to the drawing it will be seen that the perforations in the fixed disk or plate E are finer than those in the top plate, D; but the former should be sufficiently fine to prevent the fine grains of sand which form the filter-charge I from passing through it. Whenever it becomes necessary to cleanse the sand from the sediment deposited thereon by the muddy water, the inner receptacle or sand-holder, B, can be easily lifted out, after removing the cover, by means of the hand-hole G in the central partition, and by placing it under a hydrant and stirring the sand it may be thoroughly washed and cleaned, when it will be ready for use again, this cleansing operation requiring only a few minutes.

Having thus described my invention, I claim and desire to secure by Letters Patent of the United States—

The combination of the outside vessel or receptacle having a neck or contracted part provided with the fixed foraminated plate E, and the removable inside vessel, B, provided with the perforated cover C, foraminated bottom plate, D, and central partition, H, having hand-hole G, substantially as and for the purpose shown and set forth.

In testimony that I claim the foregoing as my own I have hereunto affixed my signature in presence of two witnesses.

EMILE KARST.

Witnesses:
JAMES CAHILL,
PATRICK McCORMICK.